(12) United States Patent
Bunazawa

(10) Patent No.: US 11,454,187 B2
(45) Date of Patent: Sep. 27, 2022

(54) TORQUE ESTIMATION DEVICE

(71) Applicant: TOYOTA JIDOSHA KABUSHIKI KAISHA, Toyota (JP)

(72) Inventor: Hideaki Bunazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/362,365

(22) Filed: Jun. 29, 2021

(65) Prior Publication Data

US 2022/0056866 A1 Feb. 24, 2022

(30) Foreign Application Priority Data

Aug. 19, 2020 (JP) .............................. JP2020-138559

(51) Int. Cl.
*F02D 41/00* (2006.01)
*F02D 41/24* (2006.01)
*F02D 41/14* (2006.01)

(52) U.S. Cl.
CPC ..... *F02D 41/2451* (2013.01); *F02D 41/1405* (2013.01); *F02D 41/2441* (2013.01); *F02D 2200/1004* (2013.01); *F02D 2200/501* (2013.01); *F02D 2200/602* (2013.01); *F02D 2200/702* (2013.01)

(58) Field of Classification Search
CPC ............. F02D 41/2451; F02D 41/1405; F02D 41/2441; F02D 2200/1004; F02D 2200/501; F02D 2200/602; F02D 2200/702
See application file for complete search history.

(56) References Cited

U.S. PATENT DOCUMENTS

| | | | | |
|---|---|---|---|---|
| 2012/0158257 A1* | 6/2012 | Stursa | ................... | B60K 23/08 701/52 |
| 2012/0179327 A1* | 7/2012 | Yngve | ................ | B60W 40/064 701/32.9 |
| 2013/0184966 A1* | 7/2013 | Lockwood | .......... | F02D 41/1497 701/102 |
| 2013/0296124 A1* | 11/2013 | Pietron | ............... | B60W 10/023 180/65.265 |
| 2013/0345917 A1* | 12/2013 | Ozaki | ..................... | B60L 3/106 701/22 |

(Continued)

FOREIGN PATENT DOCUMENTS

JP 2017-110611 A 6/2017

*Primary Examiner* — Sizo B Vilakazi
*Assistant Examiner* — Sherman D Manley
(74) *Attorney, Agent, or Firm* — Oliff PLC

(57) ABSTRACT

A control device serving as a torque estimation device includes a storage device and a processing circuit. The storage device stores data of a trained neural network. The trained neural network is trained using training data including data of an actually-measured torque that is measured, data of an accelerator operation amount in a period of a predetermined length up to a time point of measurement of the actually-measured torque, and data of an acceleration of a vehicle from the time point of measurement of the actually-measured torque onward. The processing circuit inputs, to the trained neural network stored in the storage device, input data including the data of the accelerator operation amount and the data of the acceleration of the vehicle, to estimate a torque generated in a power transmission member.

9 Claims, 6 Drawing Sheets

(56) References Cited

U.S. PATENT DOCUMENTS

| | | | | |
|---|---|---|---|---|
| 2014/0148993 A1* | 5/2014 | Brathe | ............... | G01L 3/24 |
| | | | | 701/34.4 |
| 2014/0371989 A1* | 12/2014 | Trimboli | ............ | B60W 40/09 |
| | | | | 701/41 |
| 2015/0276050 A1* | 10/2015 | Fodor | ............... | F16H 59/14 |
| | | | | 701/60 |
| 2016/0244049 A1* | 8/2016 | Petridis | ............ | B60W 20/19 |
| 2016/0325745 A1* | 11/2016 | Kim | ............... | B60W 30/16 |
| 2017/0225564 A1* | 8/2017 | Christensen | ....... | B60K 23/08 |
| 2018/0093655 A1* | 4/2018 | Healy | ............... | B60L 1/02 |
| 2018/0201250 A1* | 7/2018 | D'Amato | .......... | B60W 10/06 |
| 2019/0023257 A1* | 1/2019 | Doering | ............ | F16H 61/688 |
| 2019/0210603 A1* | 7/2019 | Xu | ............... | B60W 10/184 |
| 2019/0227528 A1* | 7/2019 | Abbott | ............ | G05B 19/4155 |
| 2019/0241039 A1* | 8/2019 | Simula | ............ | B60G 21/0551 |
| 2019/0367006 A1* | 12/2019 | Furusho | ............ | B60K 6/48 |

\* cited by examiner

INPUT LAYER        HIDDEN LAYER        OUTPUT LAYER

TORQUE ESTIMATION DEVICE

CROSS-REFERENCE TO RELATED APPLICATION

This application claims priority to Japanese Patent Application No. 2020-138559 filed on Aug. 19, 2020, incorporated herein by reference in its entirety.

BACKGROUND

1. Technical Field

The present disclosure relates to a torque estimation device.

2. Description of Related Art

Japanese Unexamined Patent Application Publication No. 2017-110611 (JP 2017-110611 A) discloses a torque estimation device that calculates a delayed accelerator operation amount that reflects a delay in the response of the engine to the accelerator operation, and uses the delayed accelerator operation amount to estimate a torque output by the engine. The torque estimation device predicts the engine torque based on the delayed accelerator operation amount and the engine speed, using the relationship between the delayed accelerator operation amount, the engine speed, and the engine torque.

SUMMARY

As a method for grasping the torque of a target location without using a sensor for measuring a torque, there is a method of predicting a torque based on the information before the torque is generated as described above. However, the above method is a prediction based on the information before the torque is generated. Therefore, the predicted value may deviate from the actual torque.

There is a demand for a torque estimation device that can estimate a torque of a target location with higher accuracy without the need for a sensor for measuring a torque.

Hereinafter, means for solving the above problems and operations and effects thereof will be described. A torque estimation device for solving the above problems includes: a storage device that stores data of a trained neural network, in which a neural network is trained, using training data including data of an actually-measured torque that is measured, data of an accelerator operation amount in a period of a predetermined length up to a time point of measurement of the actually-measured torque, and data of an acceleration of a vehicle from the time point of measurement of the actually-measured torque onward, to estimate a torque generated in a power transmission member that transmits a driving force from a driving force source mounted on the vehicle to a drive wheel based on input data including the data of the accelerator operation amount in the period of the predetermined length and the data of the acceleration of the vehicle; and a processing circuit that executes an estimation process of inputting, to the trained neural network stored in the storage device, the input data including the data of the accelerator operation amount in the period of the predetermined length and the data of the acceleration of the vehicle to estimate the torque generated in the power transmission member.

According to the above configuration, the torque generated in the power transmission member is estimated by inputting the acceleration of the vehicle realized as a result of the torque transmission. Thus, the torque can be estimated without the need for a sensor for measuring the torque. Further, the torque can be estimated with higher accuracy compared with the case where the torque is predicted based only on the information before the torque to be estimated is generated, such as the accelerator operation amount.

In the aspect of the torque estimation device, the input data includes, as data including the data of the accelerator operation amount in the period of the predetermined length and the data of the acceleration of the vehicle, time series data of the accelerator operation amount and the acceleration of the vehicle in a reference period including a prescribed period from the period of the predetermined length onward. The neural network is a recurrent neural network that estimates a torque at a time point included in the reference period based on the input data.

According to the above configuration, the torque can be estimated in consideration of the chronological transition of the plurality of pieces of data of the accelerator operation amount and the plurality of pieces of data of the acceleration in the reference period that are included in the input data.

In the aspect of the torque estimation device, the input data includes data of a vehicle speed of the vehicle. Even when the accelerator operation amount and the acceleration of the vehicle are the same, the torque in the power transmission member is different if the vehicle speed is different. That is, the data of the vehicle speed is also the data that affects the torque. According to the above configuration, the torque can be estimated more accurately by reflecting the data of the vehicle speed.

In the aspect of the torque estimation device, the input data includes data of a brake pressure in the vehicle. Even when the accelerator operation amount and the acceleration of the vehicle are the same, the torque in the power transmission member is different if the braking force acting on the drive wheels is different. That is, the data of the brake pressure having a correlation with the braking force acting on the drive wheels is also the data that affects the torque. According to the above configuration, the torque can be estimated more accurately by reflecting the influence of the braking force acting on the drive wheels with the data of the brake pressure.

In the aspect of the torque estimation device, the input data includes data of a slope of a road surface on which the vehicle is traveling. Even when the accelerator operation amount and the acceleration of the vehicle are the same, the torque in the power transmission member is different if the slope of the road surface on which the vehicle is traveling is different. That is, the data of the slope of the road surface is also the data that affects the torque. According to the above configuration, the torque can be estimated more accurately by reflecting the data of the slope of the road surface.

In the aspect of the torque estimation device, the input data includes data of a gear ratio of the vehicle. Even when the accelerator operation amount and the acceleration of the vehicle are the same, the torque in the power transmission member is different if the gear ratio is different. That is, the data of the gear ratio is also the data that affects the torque. According to the above configuration, the torque can be estimated more accurately by reflecting the data of the gear ratio.

In the aspect of the torque estimation device, the torque estimation device is mounted on the vehicle and estimates the torque generated in the power transmission member in the vehicle. According to the above configuration, the torque in the own vehicle can be estimated in the vehicle.

In the aspect of the torque estimation device, the torque estimation device further includes a receiver for receiving the input data transmitted from the vehicle, and the torque estimation device uses the input data received by the receiver to estimate the torque generated in the power transmission member in the vehicle.

According to the above configuration, the torque estimation device can be installed outside the vehicle. Thus, it is possible to obtain a torque estimation device that is not restricted by the requirements for mounting on a vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
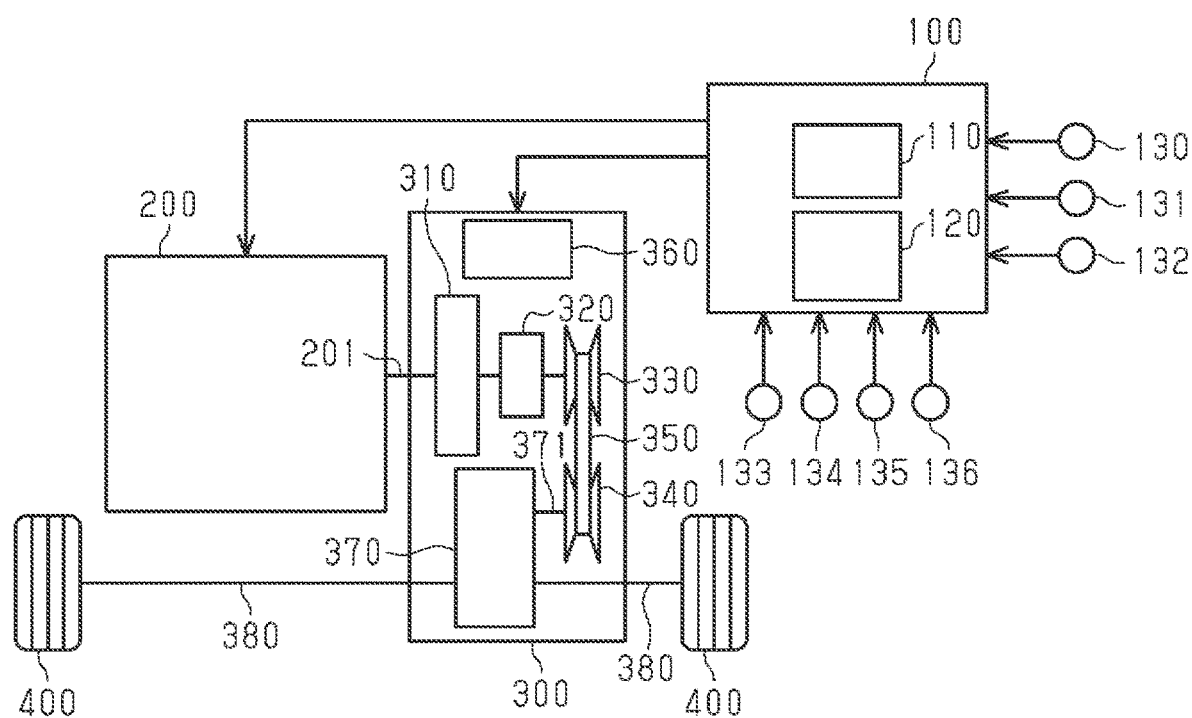
FIG. 1 is a schematic diagram showing a relationship between a control device of a first embodiment, and an engine and a transmission in a vehicle.

Hereinafter, a first embodiment of a torque estimation device will be described with reference to FIGS. 1 to 6.
FIG. 1 shows a control device 100 that is a torque estimation device and a powertrain of a vehicle on which the control device 100 is mounted.

The powertrain is composed of an engine 200 and a transmission 300. The control device 100 controls the engine 200 and the transmission 300. The control device 100 is also a torque estimation device that estimates a torque in the transmission 300 that is a power transmission member that transmits the driving force of the engine 200 to drive wheels 400.

The transmission 300 includes a primary pulley 330, a secondary pulley 340, and a belt 350 wound around the primary pulley 330 and the secondary pulley 340. The transmission 300 transmits the driving force via the belt 350. In the transmission 300, the winding radii of the belt 350 on the primary pulley 330 and the secondary pulley 340 are changed with the operation of the primary pulley 330 and the secondary pulley 340. That is, the transmission 300 is a continuously variable transmission that changes the gear ratio steplessly by changing the winding radius of the belt 350.

The transmission 300 includes a switching mechanism 320. The primary pulley 330 is connected to an output shaft 201 of the engine 200 via the switching mechanism 320 and a torque converter 310. The switching mechanism 320 is a mechanism for performing switching between a reverse state in which the rotation transmitted through the output shaft 201 is reversed and transmitted to the primary pulley 330 and a forward state in which the rotation transmitted through the output shaft 201 is transmitted to the primary pulley 330 without being reversed. The rotation of the output shaft 201 of the engine 200 is transmitted to the primary pulley 330 via the switching mechanism 320. The rotation of the primary pulley 330 is transmitted to the secondary pulley 340 via the belt 350.

The transmission 300 includes a reduction mechanism 370 that decelerates the rotation transmitted from the secondary pulley 340 and transmits it to the drive wheels 400. An input shaft 371 of the reduction mechanism 370 is connected to the secondary pulley 340. Drive shafts 380 that are output shafts of the reduction mechanism 370 are connected to the right and left drive wheels 400. Thus, the driving force transmitted from the engine 200 is changed in speed by the transmission 300 and the reduction mechanism 370 and transmitted to the drive wheels 400.

The transmission 300 includes a hydraulic circuit 360. The hydraulic circuit 360 controls the oil pressure in the primary pulley 330 and the oil pressure in the secondary pulley 340. In the transmission 300, the winding radii of the belt 350 on the primary pulley 330 and the secondary pulley 340 are changed by changing the oil pressure. Further, the hydraulic circuit 360 performs switching between the forward state and the reverse state by controlling the oil pressure supplied to the switching mechanism 320.

The control device 100 includes a storage device 120 in which a program is stored, and a processing circuit 110 that executes the program stored in the storage device 120 to execute various controls. The control device 100 operates the transmission 300 through the control of the hydraulic circuit 360 to perform switching between the forward state and the reverse state and change the gear ratio. Further, the control device 100 controls various parts of the engine 200 and controls the output of the engine 200. The engine 200, the transmission 300, and various sensors for detecting the state of the vehicle are connected to the control device 100.

For example, an accelerator position sensor 130 is connected to the control device 100. The accelerator position sensor 130 detects an accelerator operation amount that is an amount of operation of the accelerator pedal by a driver. An acceleration sensor 131 is connected to the control device 100. The acceleration sensor 131 detects an acceleration of the vehicle in the front-rear direction. A vehicle speed sensor 132 is connected to the control device 100. The vehicle speed sensor 132 detects a vehicle speed, which is the speed of the vehicle. A crank position sensor 133 is connected to the control device 100. The crank position sensor 133 outputs a crank angle signal corresponding to the rotation angle of a crankshaft that is the output shaft 201 of the engine 200. The control device 100 calculates an engine speed that is a rotation speed of the output shaft 201, based on the crank angle signal output from the crank position sensor 133. A brake pressure sensor 134 is connected to the control device 100. The brake pressure sensor 134 detects a brake pressure in a brake master cylinder mounted on the vehicle. An oil temperature sensor 135 is connected to the control device 100. The oil temperature sensor 135 detects an oil temperature that is the temperature of the oil supplied to the engine 200 and the transmission 300. A coolant temperature sensor 136 is connected to the control device 100. The coolant temperature sensor 136 detects a coolant temperature that is the temperature of the coolant for cooling the engine 200 and the transmission 300.

Further, the control device 100 estimates the torque in the transmission 300. For example, the control device 100 estimates the torque generated in the drive shaft 380 in the transmission 300 based on the data acquired while the vehicle is being driven.

Next, the estimation of a torque will be described. The storage device 120 of the control device 100 stores the data of a trained neural network used for estimation of the torque.

Figure 2:
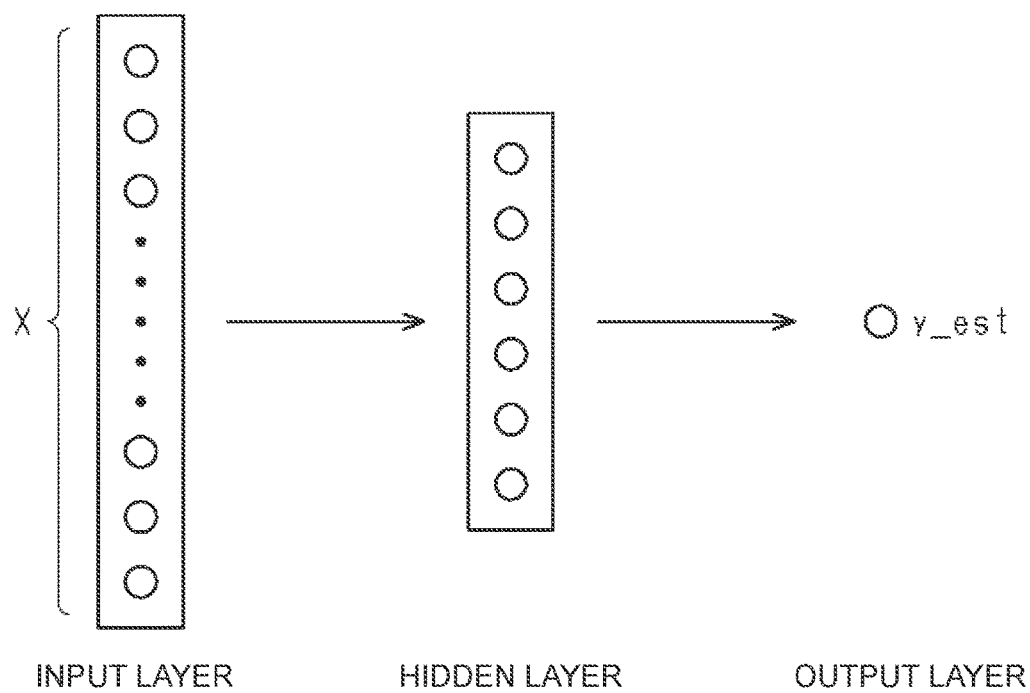
FIG. 2 is a schematic diagram showing a structure of a neural network for estimating a torque.

As shown in FIG. 2, the neural network stored in the storage device 120 of the control device 100 is a fully connected forward propagation neural network. In FIG. 2, the notation of the transmission lines connecting the nodes of adjacent layers is omitted.

As shown at the left end of FIG. 2, the neural network includes an input layer having a plurality of nodes. The number of nodes in the input layer is equal to the number of dimensions of input data X. Content of the input data X will be described later.

As shown at the right end of FIG. 2, the neural network includes an output layer having one node. The neural network has a hidden layer composed of a plurality of layers having a smaller number of nodes than the input layer between the input layer and the output layer.

The activation function in the hidden layer of the neural network is, for example, a hyperbolic tangent. The activation function may be a sigmoid function. The activation function may be a rectified linear unit (ReLU) function. Further, the number of layers in the hidden layer and the number of nodes in each layer of the hidden layer are hyperparameters set after adjustment at the design stage so that the torque can be estimated appropriately.

In the neural network, by inputting the multidimensional input data X to the input layer, the sum of the weighted values corresponding to respective transmission lines is input to the activation function. Then, the output value of the activation function is input to the next layer. These operations are repeated, and finally the torque estimated value y_est is output from the output layer.

Figure 3:
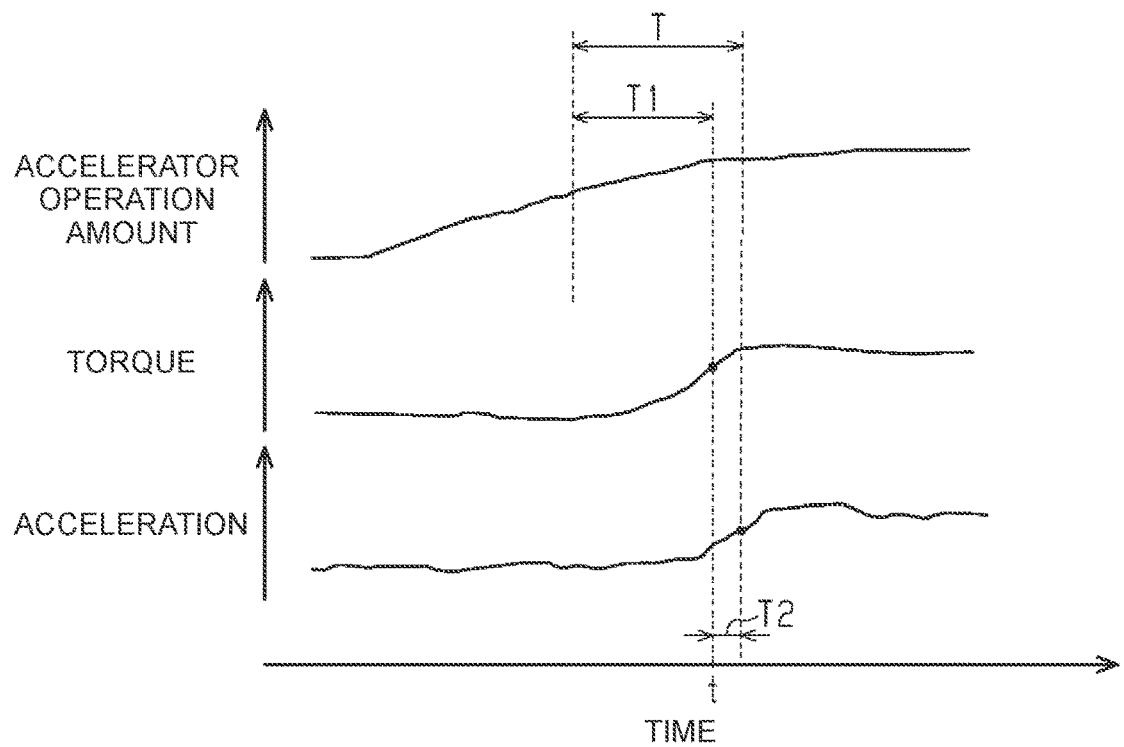
FIG. 3 is a graph showing a relationship between a transition of an accelerator operation amount, a transition of a torque, a transition of an acceleration, and input data in the control device of the first embodiment.

FIG. 3 shows transitions of the accelerator operation amount, the torque in the drive shaft 380, and the acceleration of the vehicle. As shown in FIG. 3, as the accelerator operation amount increases, the torque in the drive shaft 380 increases with a slight delay. As the throttle valve opening degree of the engine 200 increases due to the increase in the accelerator operation amount, the amount of the air-fuel mixture provided for combustion increases with a slight delay. Then, when the output of the engine 200 is increased, the driving force is transmitted to the torque converter 310, the switching mechanism 320, the primary pulley 330, the belt 350, the secondary pulley 340, and the reduction mechanism 370, and the torque in the drive shaft 380 increases. This is the reason why the increase in torque delays with respect to the increase in the accelerator operation amount. When the torque in the drive shaft 380 increases, the rotation speed of the drive wheels 400 increases, and the acceleration of the vehicle increases.

In this way, the torque in the drive shaft 380 increases and decreases in accordance with the change in the accelerator operation amount. Further, the acceleration of the vehicle fluctuates in accordance with the increase and decrease in the torque in the drive shaft 380.

As shown in FIG. 3, in the control device 100, in order to estimate the torque generated in the drive shaft 380 at a certain time point t, the input data X is used that includes a plurality pieces of data of the accelerator operation amount during a first predetermined period T1 up to the time point t and acceleration data at the time point when a second predetermined period T2 has elapsed from the time point t.

Specifically, the processing circuit 110 of the control device 100 creates the input data X from the data acquired during a reference period T including the first predetermined period T1 and the second predetermined period T2 as shown in FIG. 3. For example, the processing circuit 110 of the control device 100 acquires the accelerator operation amount and the acceleration of the vehicle at regular time intervals and stores them in the storage device 120 while the vehicle is being driven. Then, the processing circuit 110 uses, as the input data X, a plurality of values of the accelerator operation amount acquired during the first predetermined period T1 and a value of the acceleration of the vehicle acquired at the end of the reference period T. That is, when the value of the accelerator operation amount is acquired 10 times during the first predetermined period T1 of the reference period T, the input data X is 11-dimensional data composed of 10 values of the accelerator operation amount and one value of the acceleration.

Thus, in this case, the neural network stored in the storage device 120 includes an input layer having 11 nodes. Then, the neural network outputs the torque estimated value y_est that is an estimated value of the torque generated in the drive shaft 380 at the time point t in the reference period T based on the input data X.

The neural network stored in the storage device 120 is a trained neural network that has been supervised and trained in advance using training data including an actually-measured torque that is a measured value of the torque in the drive shaft 380.

Figure 4:
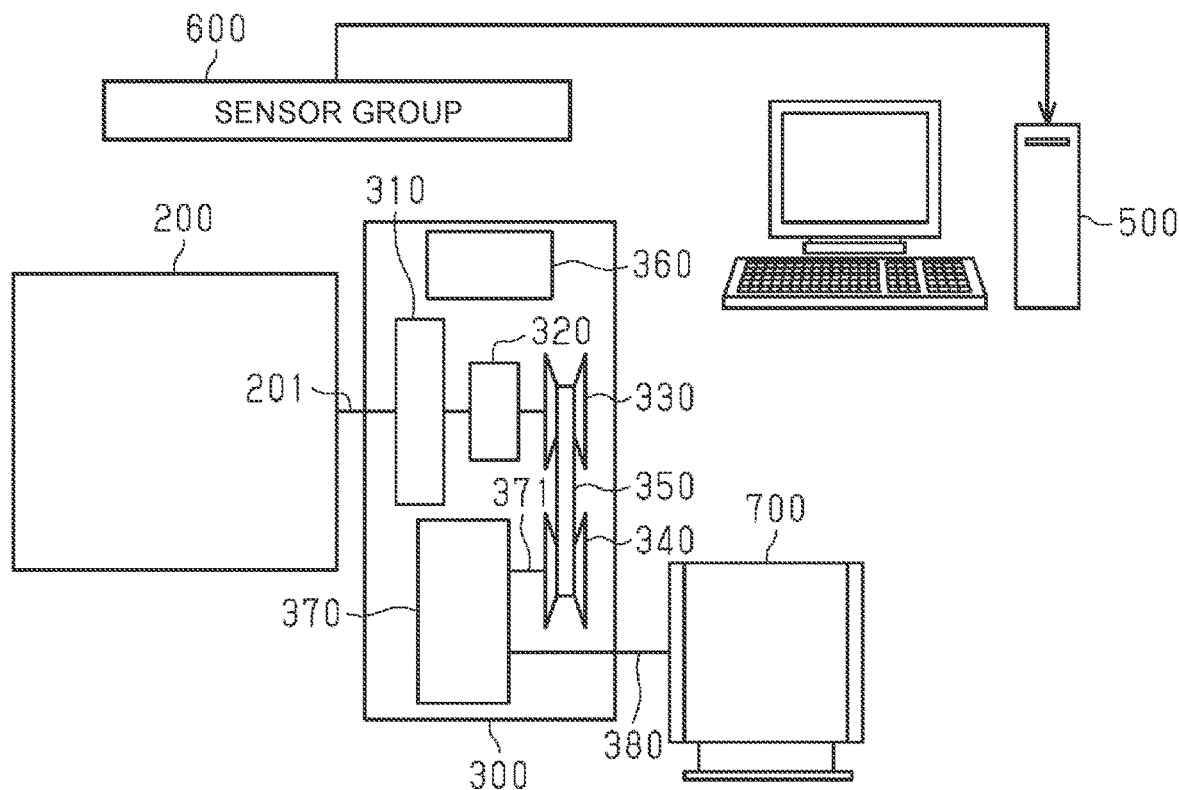
FIG. 4 is a schematic diagram showing a configuration of a system for acquiring training data.

Next, a training process of the neural network will be described with reference to FIGS. 4 and 5. FIG. 4 shows a system for generating the training data. The training data is generated with the powertrain connected to a dynamometer 700, as shown in FIG. 4. The drive shaft 380 of the transmission 300 is connected to the dynamometer 700. Further, a sensor group 600 including various sensors is connected to the engine 200 and the transmission 300. The data detected by the sensor group 600 while controlling the engine 200 and the transmission 300 in various states is input to a computer 500. The sensor group 600 includes the accelerator position sensor 130 that detects the accelerator operation amount and the vehicle speed sensor 132.

Further, the dynamometer 700 measures the torque in the drive shaft 380 and the rotation speed of the drive shaft 380. The data of the measured torque and rotation speed is also input to the computer 500. The computer 500 calculates the acceleration of the vehicle from the change in the rotation speed of the drive shaft 380, and collects the calculated acceleration as the data of the acceleration of the vehicle.

In this way, as shown in FIG. 3, the computer 500 collects data of the accelerator operation amount, the actually-measured torque that is the measured torque, and the acceleration. Then, the computer 500 generates the training data based on the data thus collected, and trains the neural network based on the training data.

Figure 5:
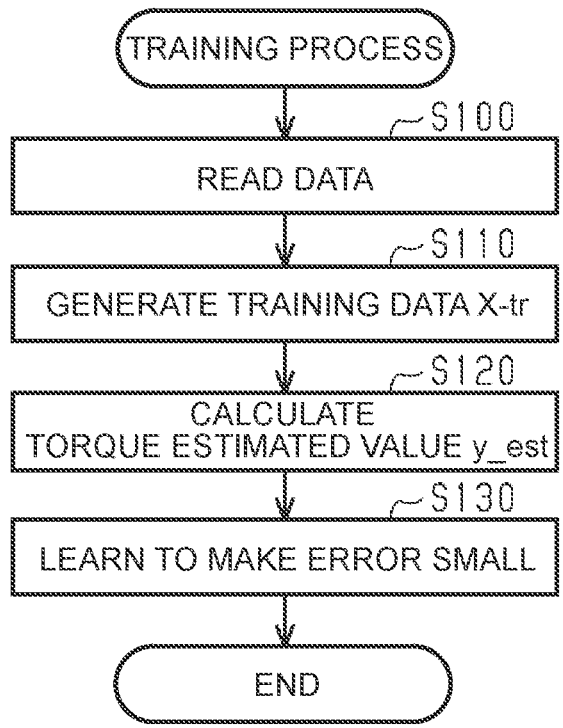
FIG. 5 is a flowchart showing a flow of a series of processes related to training of the neural network in the control device of the first embodiment.
Figure 6:
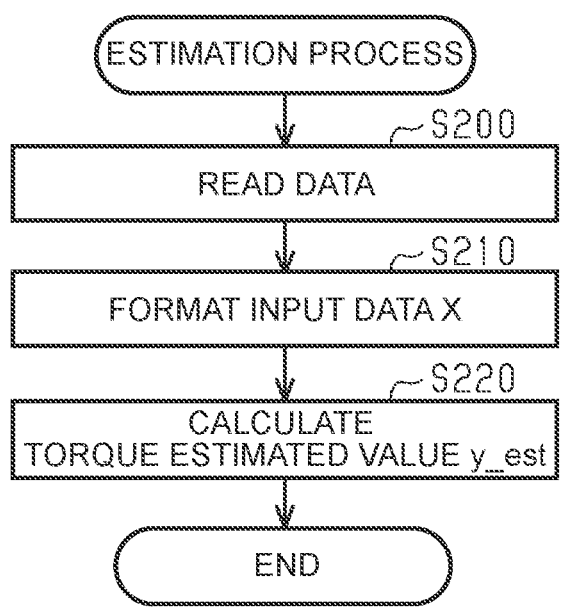
FIG. 6 is a flowchart showing a flow of a series of processes related to a torque estimation process in the control device of the first embodiment.

FIG. 5 is a flowchart showing the flow of the training process. In the training process, the computer 500 first reads time series data of the accelerator operation amount, the actually-measured torque, and the acceleration in the process of step S100.

Then, in the process of the next step S110, the computer 500 generates a plurality of pieces of training data X_tr from the read data. Specifically, 10 chronologically consecutive pieces of data of the accelerator operation amount in the first predetermined period T1 shown in FIG. 3 are substituted into x(1) to x(10), and data of the acceleration at the end of the reference period T is substituted into x(11). The data of the accelerator operation amount is substituted into x(1) to x(10) in chronological order. That is, the value substituted into x(1) is the data of the oldest accelerator operation amount in the first predetermined period T1, and the value substituted into x(10) is the data of the latest accelerator operation in the first predetermined period T1. In this way, 11-dimensional data similar to the input data X is generated, and the actually-measured torque corresponding to the torque at the time point t of the reference period T is assigned as a correct answer label to generate one training data X_tr.

When generating countless training data X_tr from the data read in this way, the computer 500 then inputs the data of x(1) to x(11) corresponding to the input data X, out of the training data X_tr, to the neural network to calculate the torque estimated value y_est in the process of step S120.

Then, in the process of the next step S130, the computer 500 adjusts the weights in the neural network so as to make the error small between the torque estimated value y_est calculated through the process of step S120 and the actually-measured torque that is the correct answer label in the training data X_tr used for the estimation.

Then, the computer 500 repeats the calculation of the torque estimated value y_est in the process of step S120 and the adjustment of the weights in the process of step S130. When the error of the torque estimated value y_est calculated by using the neural network becomes sufficiently small, the computer 500 determines that the training is completed, stores the data of the trained neural network in the storage device 120, and ends the training process.

The storage device 120 of the control device 100 stores the trained neural network in which the weights have been adjusted through the training process. Next, the torque estimation process executed by the processing circuit 110 of the control device 100 will be described. The processing circuit 110 estimates the torque generated in the drive shaft 380 of the transmission 300 by executing the estimation process shown in FIG. 6 while the vehicle is being driven.

The control device 100 collects detected values from various sensors during operation. For example, the control device 100 continues to collect data of the accelerator operation amount and the acceleration, and while updating each time new data is collected, the control device 100 constantly stores the data for the length of the reference period T in the storage device 120.

When the determination process is started, the processing circuit 110 first reads the data stored in the storage device 120 in the process of step S200. Then, the processing circuit 110 formats the input data X with the data extracted from the read data in the process of step S210.

Specifically, the processing circuit 110 extracts the data of the accelerator operation amount in the period corresponding to the first predetermined period T1 from the read data in the reference period T. Here, as with the training data X_tr described above, 10 pieces of data are extracted. Then, the processing circuit 110 substitutes the extracted 10 values of the accelerator operation amount into x(1) to x(10) in chronological order in the same manner as with the training data X_tr. Further, the processing circuit 110 extracts the data of the acceleration at the end of the reference period T from the read data and substitutes the value into x(11). In this way, the processing circuit 110 formats the 11-dimensional input data X from the read data.

Next, in the process of step S220, the processing circuit 110 inputs the input data X to the trained neural network stored in the storage device 120, and calculates the torque estimated value y_est.

When the torque estimated value y_est is thus calculated, the processing circuit 110 stores the value in the storage device 120 and ends the estimation process.

The operations of the present embodiment will be described.

In the control device 100 of the first embodiment, the input data X including the data of the accelerator operation amount in the first predetermined period T1 up to the time point t and the data of the acceleration at the end of the second predetermined period T2 from the time point t is used to calculate the torque estimated value y_est.

Then, in the estimation process, the input data X is input to the trained neural network on which the training process has been performed with the training data X_tr including the actually-measured torque so as to calculate the torque estimated value y_est.

That is, in the control device 100, for estimating the torque at the time point t, not only the information on the accelerator operation amount up to the time point t but also the information on the acceleration from the time point t onward that is changed with the influence of the torque is used.

The effects of the present embodiment will be described.

(1) In the control device 100, the torque generated in the drive shaft 380 is estimated by inputting the acceleration of the vehicle realized as a result of the torque being transmitted. Thus, the torque can be estimated without the need for a sensor for measuring the torque. Further, the torque can be estimated with higher accuracy compared with the case where the torque is predicted based only on the information before the torque at the time point t to be estimated is generated, such as the accelerator operation amount.

The estimated torque can be used, for example, to estimate the degree of fatigue of the drive shaft 380. That is, a utilization method is conceivable in which the estimated torque is integrated to estimate the degree of fatigue of the drive shaft 380, and the occurrence of a failure is predicted in advance.

(2) A method of predicting a torque based on information before the torque is generated is well known, but the method of predicting a torque based on information before the torque is generated is only a prediction based on information before the torque is generated. Therefore, it is difficult to create a forecast model that can be used in various situations. In contrast, the trained neural network stored in the storage device 120 of the control device 100 is generated by training the neural network through supervised learning. With such a method, it is possible to generate a model that can be used in various situations, through the training using training data corresponding to various situations.

(3) The control device 100 mounted on the vehicle is a torque estimation device. The processing circuit 110 of the control device 100 estimates the torque generated in the drive shaft 380 in the vehicle on which the control device 100 is mounted. Therefore, the torque in the own vehicle can be estimated in the vehicle.

Second Embodiment

A second embodiment will be described with reference to the drawings, focusing on the differences from the first embodiment. In the second embodiment, the torque generated in the drive shaft 380 at the time point t in the reference period T is estimated using the time series data including the data of the accelerator operation amount and the data of the acceleration collected during the reference period T.

Figure 7:
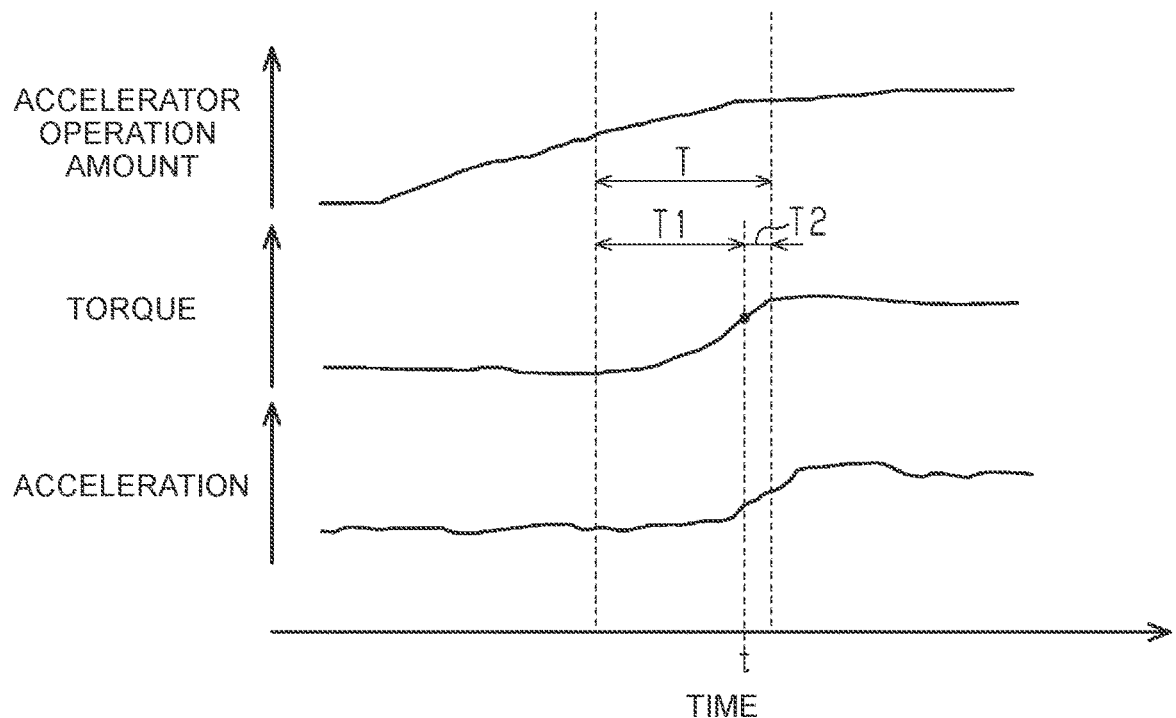
FIG. 7 is a graph showing a relationship between a transition of an accelerator operation amount, a transition of a torque, a transition of an acceleration, and input data in a control device of a second embodiment.

As shown in FIG. 7, in the control device 100 of the second embodiment, the time series data including the data of the accelerator operation amount and the data of the acceleration collected during the reference period T that is the sum of the first predetermined period T1 and the second predetermined period T2 is input to the trained neural network, with the information on the transition along the time axis retained as it is. Then, the torque estimated value y_est that is an estimated value of the torque generated in the drive shaft 380 at the time point t is calculated.

The input data X in the control device 100 of the second embodiment is time series data of the collected data including the data of the accelerator operation amount and the data of the acceleration collected at regular time intervals during the reference period T.

That is, when data is collected 15 times during the reference period T, the input data X is a group of 15 pieces of collected data from the collected data X(1) to the collected data X(15). The collected data X(1) is composed of the data of the accelerator operation amount and the data of the acceleration collected first in the reference period T, and the collected data X(15) is composed of the data of the accelerator operation amount and the data of the acceleration collected last in the reference period T.

Figure 8:
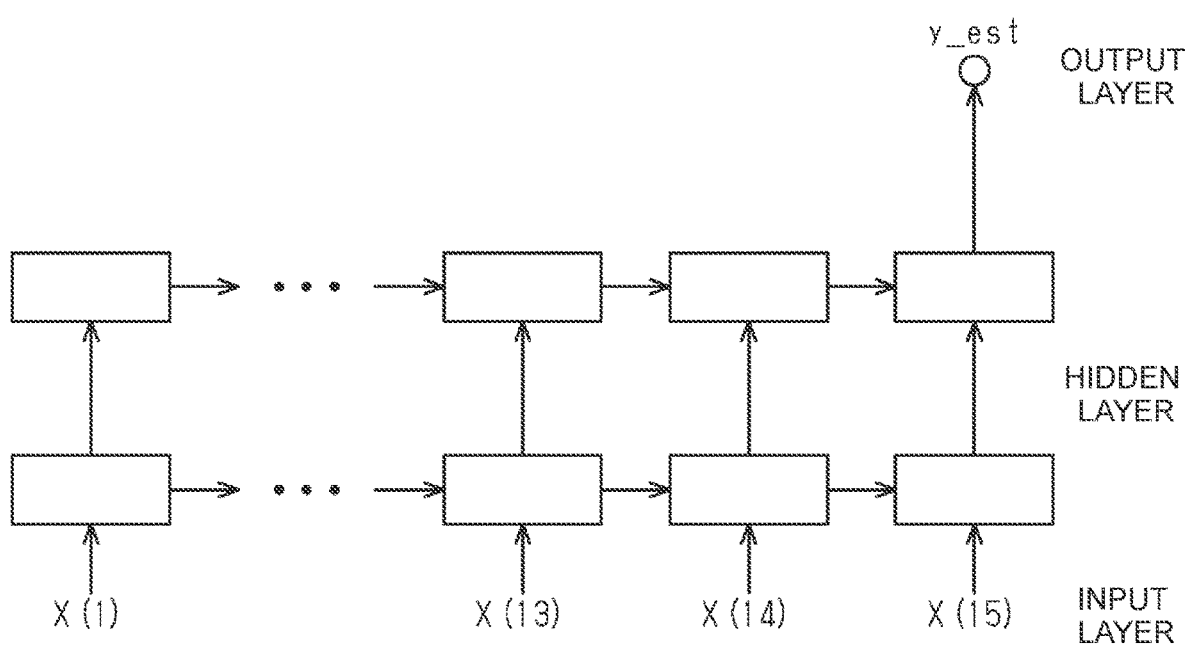
FIG. 8 is a schematic diagram showing a structure of a recurrent neural network in the control device of the second embodiment.

A recurrent neural network is stored as the trained neural network in the storage device 120 of the control device 100 of the second embodiment. The recurrent neural network is a neural network configured such that the output of the past hidden layer affects the current hidden layer. FIG. 8 schematically shows the configuration of the recurrent neural network stored in the storage device 120 of the control device 100. The arrows extending in the up-down direction in FIG. 8 indicate the neural network to which the collected data is input.

The neural network that is shown at the right end in FIG. 8 and to which the collected data X(15) is input receives, as inputs, the data of the accelerator operation amount and the data of the acceleration included in the collected data X(15), and outputs the torque estimated value y_est that is an estimated value of the torque generated in the drive shaft 380 at the time point t. The neural network is a fully connected neural network that propagates forward to the output layer that outputs the torque estimated value y_est.

As shown in FIG. 8, the hidden layer of the neural network to which the collected data X(15) that is collected last in the reference period T is input reflects the output of the hidden layer of the neural network to which the collected data X(14) collected one timing earlier in the reference period T is input.

As shown in FIG. 8, the hidden layer of the neural network to which the collected data X(14) is input reflects the output of the hidden layer of the neural network to which the collected data X(13) collected one timing earlier in the reference period T is input. In this way, each neural network to which the collected data is input reflects the output of the hidden layer of the neural network to which the collected data collected one timing earlier is input.

The recurrent neural network stored in the storage device 120 of the control device 100 of the second embodiment is a trained recurrent neural network that has been supervised and trained in advance using the training data including the actually-measured torque that is a measured value of the torque in the drive shaft 380.

The system for generating the training data is the same system as that shown in FIG. 4. As shown in FIG. 7, the computer 500 collects data of the accelerator operation amount, the actually-measured torque that is the measured torque, and the acceleration. Then, the computer 500 generates the training data based on the data thus collected, and trains the recurrent neural network based on the training data.

Figure 9:
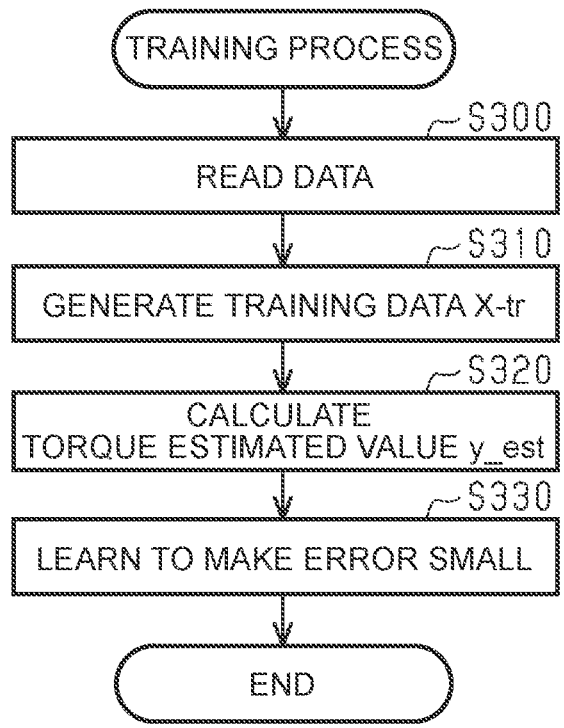
FIG. 9 is a flowchart showing a flow of a series of processes related to training of a neural network in the control device of the second embodiment.

FIG. 9 is a flowchart showing a flow of training process of the recurrent neural network that is applied to the control device 100 of the second embodiment. In the training process, the computer 500 first reads the time series data of the accelerator operation amount, the actually-measured torque, and the acceleration in the process of step S300.

Then, in the process of the next step S310, the computer 500 generates a plurality of pieces of training data X_tr from the read data. The training data X_tr here is data including actual measurement data in the group of the above-mentioned 15 pieces of collected data. Specifically, the collected data that is a combination of the data of the accelerator operation amount and the data of the acceleration collected during the reference period T shown in FIG. 7 is substituted into X(1) to X(15) in chronological order. That is, the data substituted into X(1) is the oldest collected data in the reference period T, and the data substituted into X(15) is the latest collected data in the reference period T. In this way, data having the same format as that of the input data X is generated, and the actually-measured torque corresponding to the torque at the time point t of the reference period T is assigned as a correct answer label to generate one training data X_tr.

When generating countless training data X_tr from the data read in this way, the computer 500 then inputs the data of X(1) to X(15) corresponding to the input data X, out of the training data X_tr, to the recurrent neural network to calculate the torque estimated value y_est in the process of step S320.

Then, in the process of the next step S330, the computer 500 adjusts the weights in the recurrent neural network so as to make the error small between the torque estimated value y_est calculated through the process of step S320 and the actually-measured torque that is the correct answer label in the training data X_tr used for the estimation.

Then, the computer 500 repeats the calculation of the torque estimated value y_est in the process of step S320 and the adjustment of the weights in the process of step S330. When the error of the torque estimated value y_est calculated by using the recurrent neural network becomes sufficiently small, the computer 500 determines that the training is completed, stores the data of the trained recurrent neural network in the storage device 120, and ends the training process.

Figure 10:
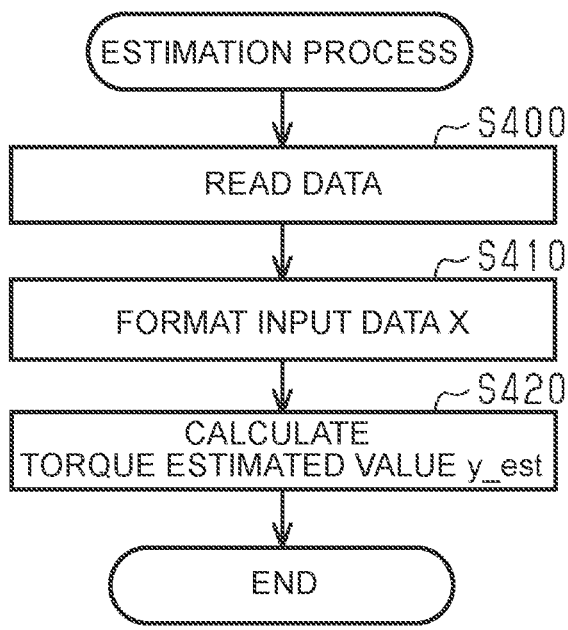
FIG. 10 is a flowchart showing a flow of a series of processes related to a torque estimation process in the control device of the second embodiment.

The storage device 120 of the control device 100 of the second embodiment stores the trained recurrent neural network in which the weights have been adjusted through the training process. Next, the torque estimation process executed by the processing circuit 110 of the control device 100 of the second embodiment will be described. The processing circuit 110 estimates the torque generated in the drive shaft 380 of the transmission 300 by executing the estimation process shown in FIG. 10 while the vehicle is being driven.

The control device 100 of the second embodiment collects detected values from various sensors during operation. For example, the control device 100 continues to collect data of the accelerator operation amount and the acceleration, and while updating each time new data is collected, the control device 100 constantly stores the data for the length of the reference period T in the storage device 120.

When the determination process is started, the processing circuit 110 first reads the data stored in the storage device 120 in the process of step S400. Then, the processing circuit 110 formats the input data X with the data read in the process of step S410.

Specifically, the processing circuit 110 substitutes the 15 pieces of collected data read in the reference period T into X(1) to X(15) in chronological order. The computer 500 thus formats the input data X in which the 15 pieces of collected data are arranged in chronological order.

Next, in the process of step S420, the processing circuit 110 inputs the input data X to the trained recurrent neural network stored in the storage device 120, and calculates the torque estimated value y_est.

When the torque estimated value y_est is thus calculated, the processing circuit 110 stores the value in the storage device 120 and ends the estimation process. The operations of the second embodiment will be described.

In the control device 100 of the second embodiment, the input data X in which the data of the accelerator operation amount and the data of the acceleration collected in the reference period T are formatted in chronological order is used for calculating the torque estimated value y_est. That is, in the control device 100 of the second embodiment, the input data X including the data of the accelerator operation amount in the first predetermined period T1 up to the time point t, the data of the acceleration at the end of the second predetermined period T2 from the time point t, and further the data collected at the other timing in the reference period T is used to calculate the torque estimated value y_est.

In the estimation process, the input data X is input to the trained recurrent neural network on which the training process has been performed with the training data X_tr including the actually-measured torque so as to calculate the torque estimated value y_est.

That is, in the control device 100 of the second embodiment, for estimating the torque at the time point t, not only the information on the accelerator operation amount up to the time point t but also the information on the acceleration from the time point t onward that is changed with the influence of the torque is used.

Further, in the control device 100 of the second embodiment, the torque estimated value y_est is calculated by using a recurrent neural network that can handle the time series data while maintaining the information on transition along the time axis. Therefore, the torque estimated value y_est is calculated with the influence of the transition along the time axis of the input on the output being reflected.

The effects of the second embodiment will be described. With the control device 100 of the second embodiment, the following effects can be obtained in addition to the effects of (1) and (2) of the first embodiment.

(3) In the control device 100 of the second embodiment, the recurrent neural network is used, so that the time series data as a whole can be reflected, as the input data X, in the calculation of the torque estimated value y_est with the information on the transition along the time axis retained. That is, the torque can be estimated in consideration of the chronological transition of the plurality of pieces of data of the accelerator operation amount and the plurality of pieces of data of the acceleration in the reference period T that are included in the input data X.

Figure 11:
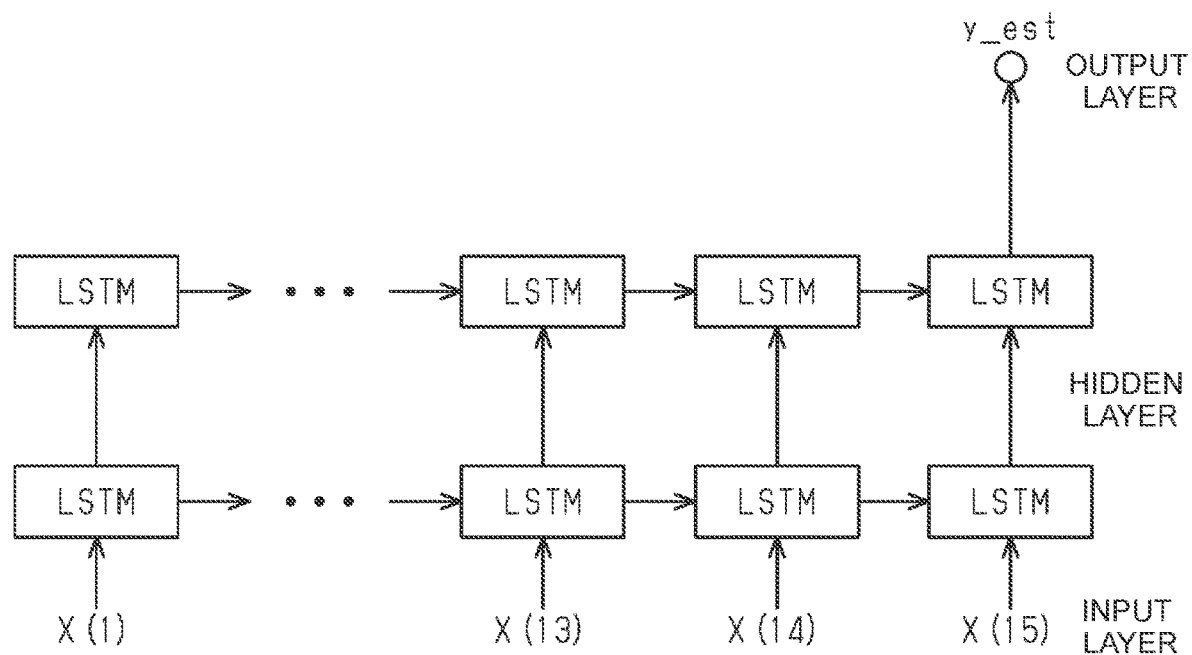
FIG. 11 is a schematic diagram showing a structure of a recurrent neural network in the control device of a modification of the second embodiment.

The second embodiment above can be modified and implemented as follows. As shown in FIG. 11, a recurrent neural network to which a technique called long short-term memory (LSTM) is applied may be adopted. The LSTM is configured such that a mechanism called LSTM block is provided in the recurrent neural network and adjustment of the propagation of time series information is enabled.

The LSTM block includes a cell for keeping the error inside to suppress the gradient from disappearing, an input gate for controlling the input to the cell, an output gate for controlling the output from the cell, and an oblivion gate for suppressing the error from excessively staying in the cell.

In addition, elements that can be changed in common for the above embodiments include the following. Modifications below may be carried out in combination within a technically consistent range. The input data X may include data of the vehicle speed that is the speed of the vehicle. Even when the accelerator operation amount and the acceleration of the vehicle are the same, the torque in the drive shaft 380 of the transmission 300 is different if the vehicle speed is different. That is, the data of the vehicle speed is also the data that affects the torque. When the data of the vehicle speed is included in the input data X, the torque can be estimated more accurately by reflecting the data of the vehicle speed.

The input data X may include data of a brake pressure in the vehicle. Even when the accelerator operation amount and the acceleration of the vehicle are the same, the torque in the drive shaft 380 of the transmission 300 is different if the braking force acting on the drive wheels 400 is different. That is, the data of the brake pressure having a correlation with the braking force acting on the drive wheels 400 is also the data that affects the torque. When the data of the brake pressure is included in the input data X, the torque can be estimated more accurately by reflecting the influence of the braking force acting on the drive wheels 400 using the data of the brake pressure.

The input data X may include data of the slope of the road surface on which the vehicle is traveling. Even when the accelerator operation amount and the acceleration of the vehicle are the same, the torque in the drive shaft 380 of the transmission 300 is different if the slope of the road surface on which the vehicle is traveling is different. That is, the data of the slope of the road surface is also the data that affects the torque. When the data of the slope of the road surface is included in the input data X, the torque can be estimated more accurately by reflecting the data of the slope of the road surface.

The input data X may include data of the gear ratio. Even when the accelerator operation amount and the acceleration of the vehicle are the same, the torque in the drive shaft 380 of the transmission 300 is different if the gear ratio is different. That is, the data of the gear ratio is also the data that affects the torque. When the data of the gear ratio is included in the input data X, the torque can be estimated more accurately by reflecting the data of the gear ratio.

In each of the above embodiments, the torque estimation device for estimating the torque in the drive shaft 380 of the transmission 300 has been exemplified, but the torque estimation device may estimate the torque in other parts of the transmission 300. For example, the torque estimation device may estimate the torque in the primary pulley 330 in the transmission 300. Further, the torque estimation device may estimate the torque input to the torque converter 310. When the parts where the torque is estimated are different, the degree of delay with which the torque changes in response to the change in the accelerator operation amount and the degree of delay with which the acceleration changes after the torque changes differ. Therefore, it is necessary to design the length of the reference period T and the time point at which the torque is estimated in the reference period T in accordance with the part where the torque is estimated.

The transmission 300 is not limited to the continuously variable transmission. The same configuration as that of the above embodiments can be applied to the torque estimation device that estimates the torque in a stepped transmission.

The target for which the torque estimation device estimates a torque is not limited to the transmission. For example, the same configuration as that of the above embodiments can be applied to the torque estimation device that estimates the torque in the output shaft 201 of the engine 200. The same configuration as that of the above embodiments can also be applied to the torque estimation device that estimates the torque in the output shaft of the motor in an electric vehicle equipped with the motor as a driving force source. The same configuration as that of the above embodiments can also be applied to the torque estimation device that estimates the torque in a hybrid vehicle.

The data included in the input data X need not to be values themselves collected by the sensors or the like. For example, data obtained by preprocessing the collected time series data may be used as the input data. Specifically, the moving average value of the collected values may be calculated in order to remove the noise included in the collected time series data, and the time series data of the moving average value may be included in the input data. Further, the time series data may be divided into a plurality of levels of intensities to count the occurrence frequencies, and information on the distribution of the occurrence frequencies may be included in the input data X.

In each of the above embodiments, an example in which the control device 100 mounted on the vehicle also serves as the torque estimation device is shown, but the torque estimation device may be configured as a device different from the control device 100 that controls the engine 200 and the transmission 300.

For example, the torque estimation device may be a test torque estimation device that is installed outside the vehicle and that acquires signals from various sensors of the vehicle to estimate the torque.

Figure 12:
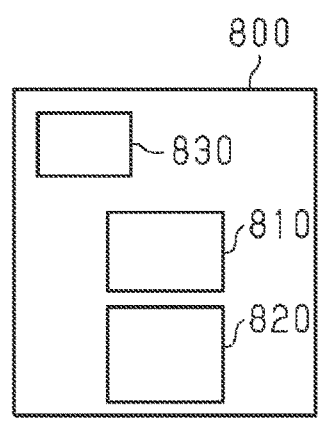
FIG. 12 is a block diagram schematically showing a configuration of a torque estimation device of the modification.

Further, as shown in FIG. 12, the torque estimation device may be provided with a receiver 830 for receiving data transmitted from the vehicle. The torque estimation device 800 is installed outside the vehicle. The torque estimation device 800 includes a processing circuit 810, a storage device 820, and a receiver 830. In the torque estimation device 800, the input data X acquired through the receiver 830 is input to the trained neural network stored in the storage device 820 to calculate the torque estimated value y_est.

As described above, the torque estimation device 800 that acquires the input data X with the receiver 830 can be installed outside the vehicle. Thus, it is possible to obtain a torque estimation device that is not restricted by the requirements for mounting on a vehicle. For example, a torque estimation device composed of a large computer that cannot be mounted on a vehicle can perform calculations at a higher speed or perform more advanced calculations than a torque estimation device mounted on a vehicle.

It is also possible to estimate the torque in a plurality of vehicles with one torque estimation device.

In each of the above embodiments, the control device 100 includes the processing circuit 110 and the storage device 120 to execute software processing. However, this is merely an example. For example, the control device 100 may include a dedicated hardware circuit (for example, an application specific integrated circuit (ASIC), etc.) that executes at least part of the software processes executed in each embodiment described above. That is, the control device 100 only needs to have any of the following configurations (a) to (c). (a) The control device 100 includes a processing device that executes all the processes according to a program and a storage device that stores the program. That is, the control device 100 includes a software execution device. (b) The control device 100 includes a processing device that executes part of the processes according to a program, and a storage device. Further, the control device 100 includes a dedicated hardware circuit that executes the remaining processes. (c) The control device 100 includes a dedicated hardware circuit that executes all the processes. Here, there may be a plurality of software execution devices and/or a plurality of dedicated hardware circuits. That is, the processes may be executed by processing circuitry including at least either of one or more software execution devices and one or more dedicated hardware circuits. A storage device that stores a program, namely, a computer-readable medium, includes any available medium accessible to a general-purpose or dedicated computer.

What is claimed is:

1. A torque estimation device comprising:
   a storage device that stores data of a trained neural network, in which a neural network is trained, using training data including:
      data of an actually-measured torque that is measured,
      data of an accelerator operation amount in a period of a predetermined length up to a time point of measurement of the actually-measured torque, and
      data of an acceleration of a vehicle from the time point of measurement of the actually-measured torque onward until a later time point,
      wherein the neural network is trained using the training data to estimate a torque generated in a power transmission member that transmits a driving force from a driving force source mounted on the vehicle to a drive wheel based on input data including the data of the accelerator operation amount in the period of the predetermined length and the data of the acceleration of the vehicle; and
   a processing circuit that executes an estimation process of inputting, to the trained neural network stored in the storage device, the input data including the data of the accelerator operation amount in the period of the predetermined length and the data of the acceleration of the vehicle to estimate the torque generated in the power transmission member.

2. The torque estimation device according to claim 1, wherein:

the input data includes, as data including the data of the accelerator operation amount in the period of the predetermined length and the data of the acceleration of the vehicle, time series data of the accelerator operation amount and the acceleration of the vehicle in a reference period including a prescribed period from the period of the predetermined length onward until the later time point; and the neural network is a recurrent neural network that estimates a torque at a time point included in the reference period based on the input data.

3. The torque estimation device according to claim 1, wherein the input data includes data of a vehicle speed of the vehicle.

4. The torque estimation device according to claim 1, wherein the input data includes data of a brake pressure in the vehicle.

5. The torque estimation device according to claim 1, wherein the input data includes data of a slope of a road surface on which the vehicle is traveling.

6. The torque estimation device according to claim 1, wherein the input data includes data of a gear ratio of the vehicle.

7. The torque estimation device according to claim 1, wherein the torque estimation device is mounted on the vehicle and estimates the torque generated in the power transmission member in the vehicle.

8. The torque estimation device according to claim 1, further comprising a receiver for receiving the input data transmitted from the vehicle, wherein the torque estimation device uses the input data received by the receiver to estimate the torque generated in the power transmission member in the vehicle.

9. The torque estimation device according to claim 1, wherein the period of the predetermined length up to the time point of measurement of the actually-measured torque is longer than a period from the time point of measurement of the actually-measured torque onward until the later time point.

* * * * *